US010990235B2

(12) United States Patent
Gospel (10) Patent No.: US 10,990,235 B2
(45) Date of Patent: Apr. 27, 2021

(54) FLEXIBLE SENSOR (71) Applicant: Peratech Holdco Ltd, Richmond (GB)

(72) Inventor: Matthew Gospel, Scorton (GB)

(73) Assignee: Peratech Holdco Ltd, Richmond (GB)

(*) Notice: Subject to any disclaimer, the term of this patent is extended or adjusted under 35 U.S.C. 154(b) by 6 days.

(21) Appl. No.: 16/336,523

(22) PCT Filed: Sep. 29, 2017

(86) PCT No.: PCT/GB2017/000145
§ 371 (c)(1),
(2) Date: Mar. 26, 2019

(87) PCT Pub. No.: WO2018/060667
PCT Pub. Date: Apr. 5, 2018

(65) Prior Publication Data
US 2020/0133418 A1 Apr. 30, 2020

(30) Foreign Application Priority Data
Oct. 1, 2016 (GB) .................................. 1616751

(51) Int. Cl.
G06F 3/045 (2006.01)
G06F 3/041 (2006.01)
G06F 1/16 (2006.01)

(52) U.S. Cl.
CPC .... *G06F 3/045* (2013.01); *G06F 2203/04102* (2013.01); *G06F 2203/04103* (2013.01)

(58) Field of Classification Search
CPC ........... G06F 3/045; G06F 2203/04103; G06F 2203/04102

USPC ......................................................... 345/174
See application file for complete search history.

(56) References Cited

U.S. PATENT DOCUMENTS

| 8,547,197 B2 | 10/2013 | Byun et al. |
| 2004/0037051 A1 | 2/2004 | Hagiwara et al. |
| 2005/0184969 A1* | 8/2005 | Dunn ...................... G06F 3/045 345/173 |

(Continued)

FOREIGN PATENT DOCUMENTS

| EP | 1380110 B1 | 10/2005 |
| EP | 2874048 A1 | 5/2015 |

OTHER PUBLICATIONS

Corresponding Great Britain Patent Application No. GB1616751.2, Great Britain Search Report dated Mar. 21, 2017.

(Continued)

Primary Examiner — Chineyere D Wills-Burns
(74) Attorney, Agent, or Firm — Cooper Legal Group, LLC (57) ABSTRACT A flexible sensor (201) comprises a first conductive layer (202) and a second conductive layer (203). The first conductive layer and the second conductive layer define a sensing region (205) for determining an interaction, such as a mechanical interaction. The first conductive layer comprises a first substrate (206) having a plurality of conductive rows (207) printed thereon and the second conductive layer comprises a second substrate 208 having a plurality of columns (209) printed thereon. The first conductive layer and the second conductive layer are constrained by a constraining means (505) which holds the two layers together but permits movement of the layers perpendicular to each other in the sensing region.

17 Claims, 12 Drawing Sheets (56) References Cited

U.S. PATENT DOCUMENTS

| | | | |
|---|---|---|---|
| 2010/0026663 A1* | 2/2010 | Iwasaki | G02F 1/13338 |
| | | | 345/174 |
| 2010/0117975 A1* | 5/2010 | Cho | G06F 1/1643 |
| | | | 345/173 |
| 2010/0201633 A1* | 8/2010 | Mozdzyn | G06F 3/045 |
| | | | 345/173 |
| 2012/0074970 A1* | 3/2012 | Graham | H03K 17/9625 |
| | | | 324/702 |
| 2013/0025904 A1* | 1/2013 | Berumen | G06F 1/182 |
| | | | 174/50.5 |
| 2013/0134025 A1* | 5/2013 | Wu | G06F 3/045 |
| | | | 200/512 |
| 2013/0249860 A1* | 9/2013 | Seo | G06F 3/045 |
| | | | 345/174 |
| 2013/0314351 A1* | 11/2013 | Sekizawa | G06F 3/045 |
| | | | 345/173 |
| 2014/0015772 A1 | 1/2014 | Tung et al. | |
| 2015/0331523 A1* | 11/2015 | McMillen | G06F 3/04146 |
| | | | 345/174 |
| 2016/0224066 A1 | 8/2016 | Hussa | |
| 2016/0231837 A1 | 8/2016 | Baek et al. | |

OTHER PUBLICATIONS

International Patent Application No. PCT/GB2017/000145, International Search Report, dated Apr. 9, 2018.
International Patent Application No. PCT/GB2017/000145, Written Opinion of the International Searching Authority, dated Apr. 9, 2018.

* cited by examiner

FLEXIBLE SENSOR

CROSS REFERENCE TO RELATED APPLICATIONS

This application claims priority from United Kingdom Patent Application No. 1616751.2, filed Oct. 1, 2016, the whole contents of which is incorporated herein by reference in its entirety.

BACKGROUND OF THE INVENTION

The present invention relates to a flexible sensor and method of manufacturing a flexible sensor.

Sensors are known to be used in a wide variety of applications and industries. In particular, sensors which provide touch capabilities in response to mechanical interactions such as pressure are often used in applications such as in electronic devices to provide touchscreens, buttons or similar. Standard matrix sensors typically include two separate substrates which include conductive materials in order to provide an indication of force or position values with the substrates being constrained to prevent movement of the substrates relative to each other.

A problem that occurs with sensors of this type is that, even if the substrates are made to be flexible, bending of the sensor (and substrates) results in compression on the inner surface of each substrate as it bends. Bending of the sensor (and substrates) also results in elongation on the outer surface of each substrate as it bends. This leads to the substrates making contact with each other thereby creating a conduction path resulting in false triggering or a start resistance being induced into the sensor from the residual stresses activated during bending. Furthermore, any induced start resistance is also uneven and thus difficult to predict due to its dependence on the radius of curvature of the bend.

In addition, for relatively thin substrates, instead of experiencing compression on the inner surface and elongation on the outer surface, the substrate buckles about the inner surface. Similarly, the buckling creates a pressure point where the substrates contact which results in a start resistance and corresponding stress to the sensor.

BRIEF SUMMARY OF THE INVENTION

According to an aspect of the present invention, there is provided a flexible sensor, comprising: a first conductive layer; and a second conductive layer; said first conductive layer and said second conductive layer define a sensing region for determining a mechanical interaction; wherein said first conductive layer comprises a first substrate having a plurality of conductive rows printed thereon; said second conductive layer comprises a second substrate having a plurality of conductive columns printed thereon; and said first conductive layer and said second conductive layer are constrained by a constraining means so as to maintain said first conductive layer and said second conductive layer together while permitting movement of the layers perpendicular to each other in said sensing region.

According to a further aspect of the present invention, there is provided a method of manufacturing a flexible sensor, comprising the steps of: providing a first conductive layer and a second conductive layer, said first conductive layer and said second conductive layer defining a sensing region for determining a mechanical interaction, said first conductive layer comprising a first substrate and said second conductive layer comprising a second substrate; printing a plurality of conductive rows on said first substrate; printing a plurality of conductive columns on said second substrate; constraining said first conductive layer and said second conductive layer by a constraining means such that said first conductive layer and said second conductive layer are maintained together while being permitted to move perpendicular to each other in said sensing region.

DETAILED DESCRIPTION OF EMBODIMENTS OF THE INVENTION

Figure 1:
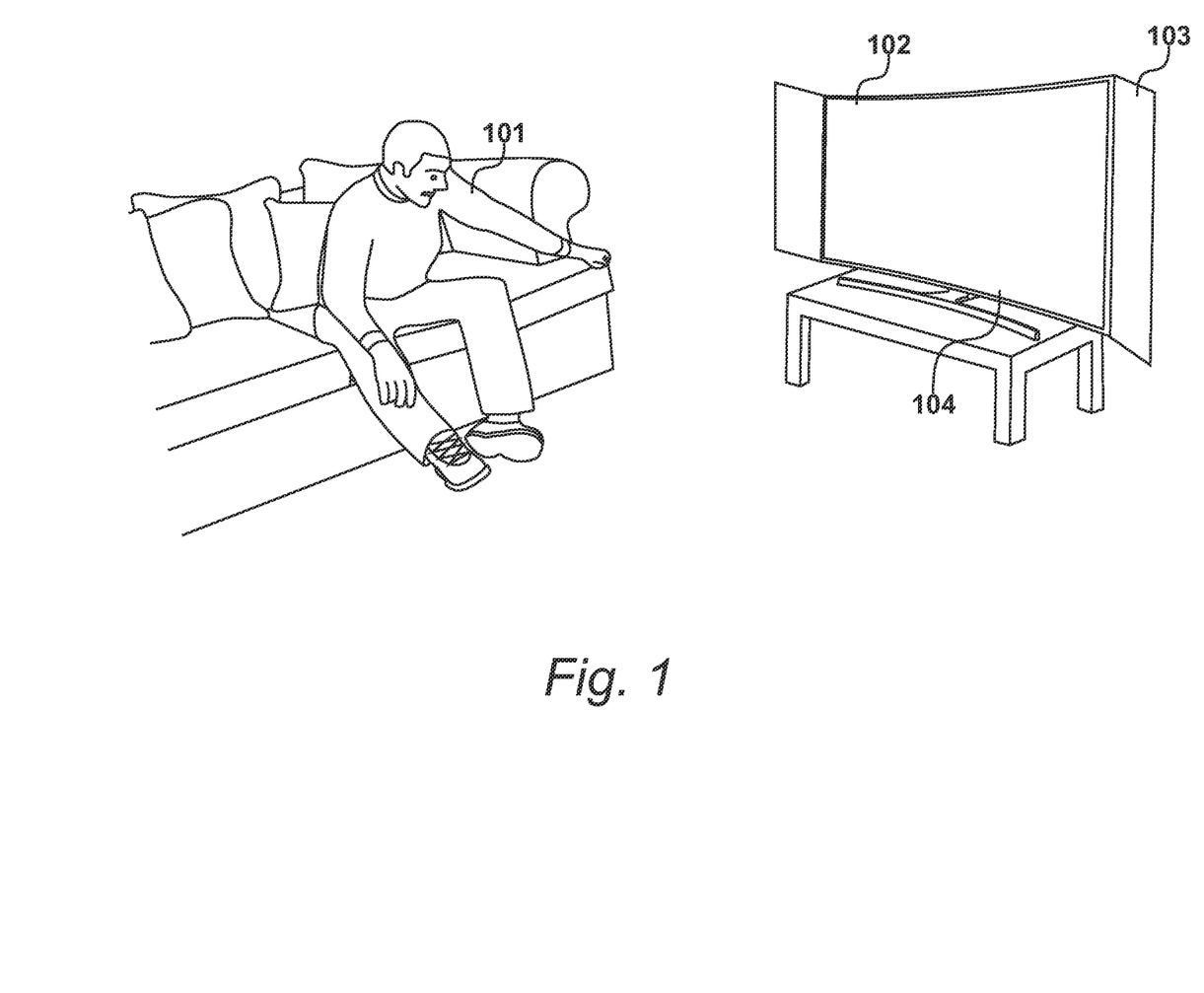
FIG. 1 shows an example application utilising a flexible sensor on a curved electronic device.

FIG. 1

An example embodiment showing the use of a flexible sensor in a typical environment is shown in FIG. 1. A user 101 is shown watching a television 102.

Television 102 is substantially curved and includes hinged members such as hinged member 103, which can be moved around to enhance the user's 101 viewing experience. Television 102 also has a screen 104 which comprises a flexible sensor which has touch capabilities such that user 101 may interact by pressing screen 104 to provide an instruction or select data.

The flexible sensor incorporated into screen 104 is substantially similar as is herein described and allows hinged member 103 to be moved effectively without incurring undue stresses or false triggering to the sensor thereby preventing reduced capacity to any touch capabilities of screen 104. Thus, user 101 is able to adjust television 102 as desired in order to view more of screen 104 of television 102 or adjust the angle it is being viewed at. Additionally, user 101 can continue to utilise the touch capacity of the television even as the screen is flexed. The flexible sensor utilised in this example will now be described in the following Figures.

Figure 2:
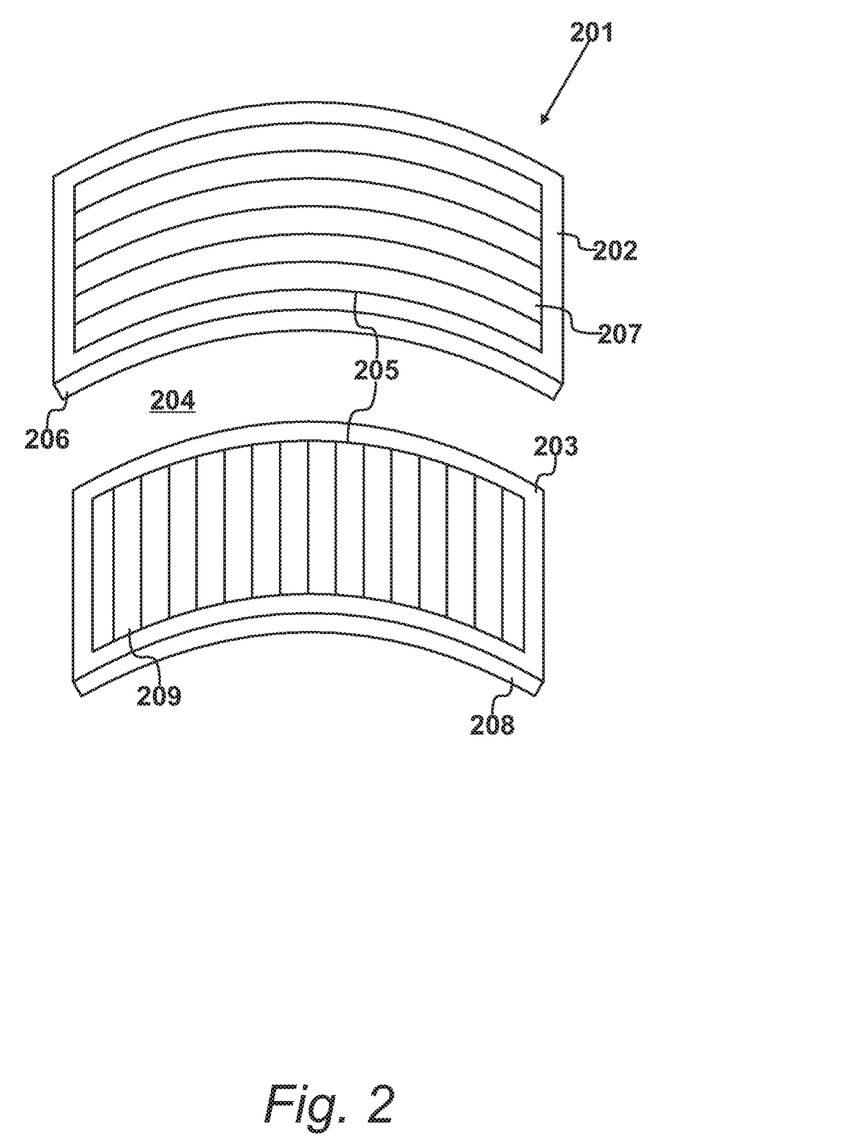
FIG. 2 shows an exploded view of conductive layers of a flexible sensor.

FIG. 2

A flexible sensor 201 in accordance with an aspect of the present invention is shown in a partially exploded view FIG. 2. Flexible sensor 201 comprises a first conductive layer 202 and a second conductive layer 203. In this diagrammatic illustration, first conductive layer 202 and second conductive layer 203 are shown in an exploded form such that there is a gap 204 between them. It is appreciated that, in practice, first conductive layer 202 and second conductive layer 203 are positioned closer together than shown and in some embodiments, gap 204 is negligible.

In combination, conductive layer 202 and conductive layer 203 combine to define a sensing region 205 which is used for determining an interaction. In an embodiment, this interaction is a mechanical interaction such as a force or pressure applied by means of a finger or stylus press. In alternative embodiments, the interaction may be chemical, electro-magnetic or from ionising radiation.

As can be seen in FIG. 2, conductive layer 202 comprises a substrate 206 which includes a plurality of conductive rows 207 printed onto the substrate.

In a similar way, conductive layer 203 comprises substrate 208 onto which a plurality of conductive columns 209 are printed. The conductive rows and columns are configured to cooperate in the manner of a matrix sensor as will be described further in FIG. 3.

In the example, substrates 206 and 208 are made from polyethylene terephthalate (PET). Each of the PET substrates are typically one hundred microns (100 μm) thick. In an alternative embodiment however, substrates 206 and 208 are manufactured from polyimide, which, in an embodiment, is typically around twelve microns (12 μm) in thickness.

Figure 3:
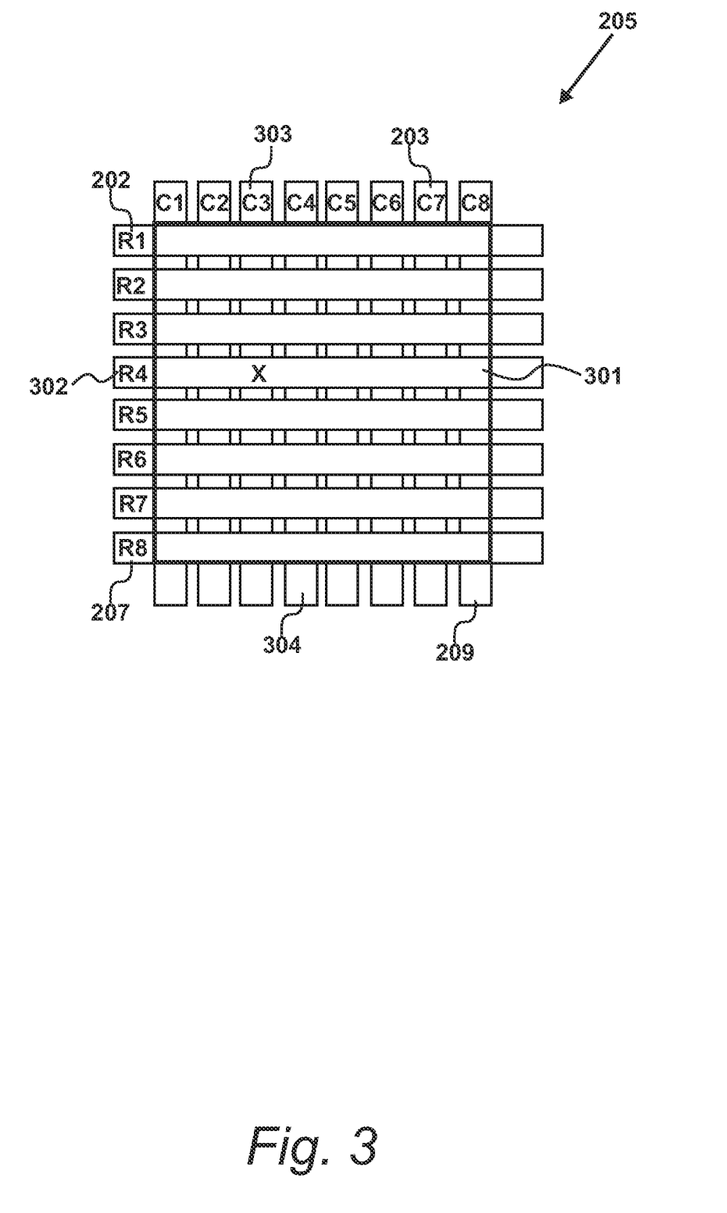
FIG. 3 shows a cross-sectional exploded view of conductive layer of a flexible sensor.

FIG. 3

FIG. 3 shows a sensing region arrangement 205 in diagrammatic form. Sensing region 205 is defined by conductive layer 202 and conductive layer 203 of which a portion of each is shown in the illustration of FIG. 3.

Conductive layer 202 comprises a plurality of conductive rows 207 and conductive layer 203 comprises a plurality of conductive columns 209. Each row is electrically insulated from the others, and similarly, each column is electrically insulated from the others.

In this example, the sensing region 205 is provided by a matrix of eight rows, indicated as R1 to R8, and eight columns, indicated by C1 to C8. A matrix sensor of this type can be utilised to detect mechanical interactions and determine positional and extent properties of that mechanical interaction. It is appreciated that, in alternative embodiments, interactions may be made by chemical, electro-magnetic or ionising radiation means and suitable sensing region arrangements are made.

With respect to the use of the terminology "rows" and "columns", it is appreciated that rows 207 and columns 209 are positioned parallel to one another within the first conductive layer 202 and second conductive layer 203 respectively. The plurality of rows are also positioned substantially perpendicularly to the plurality of columns, albeit in separate planes relating to the first conductive layer 202 and the second conductive layer 203 respectively.

In order to determine positional properties, each row is configured to allow electrical potential gradient to be established along it between a first terminal at one end of any one of the rows and a second terminal at the opposite end of the row. For example, an electrical potential gradient is established along row R4 between end 301 and end 302. Similarly, each column is configured to allow an electrical potential gradient to be established between a first end and a second end of column, such as first end 303 and second end 304 of column C3. Positional properties, for example at point X, can then be determined in a substantially conventional manner.

Figure 4:
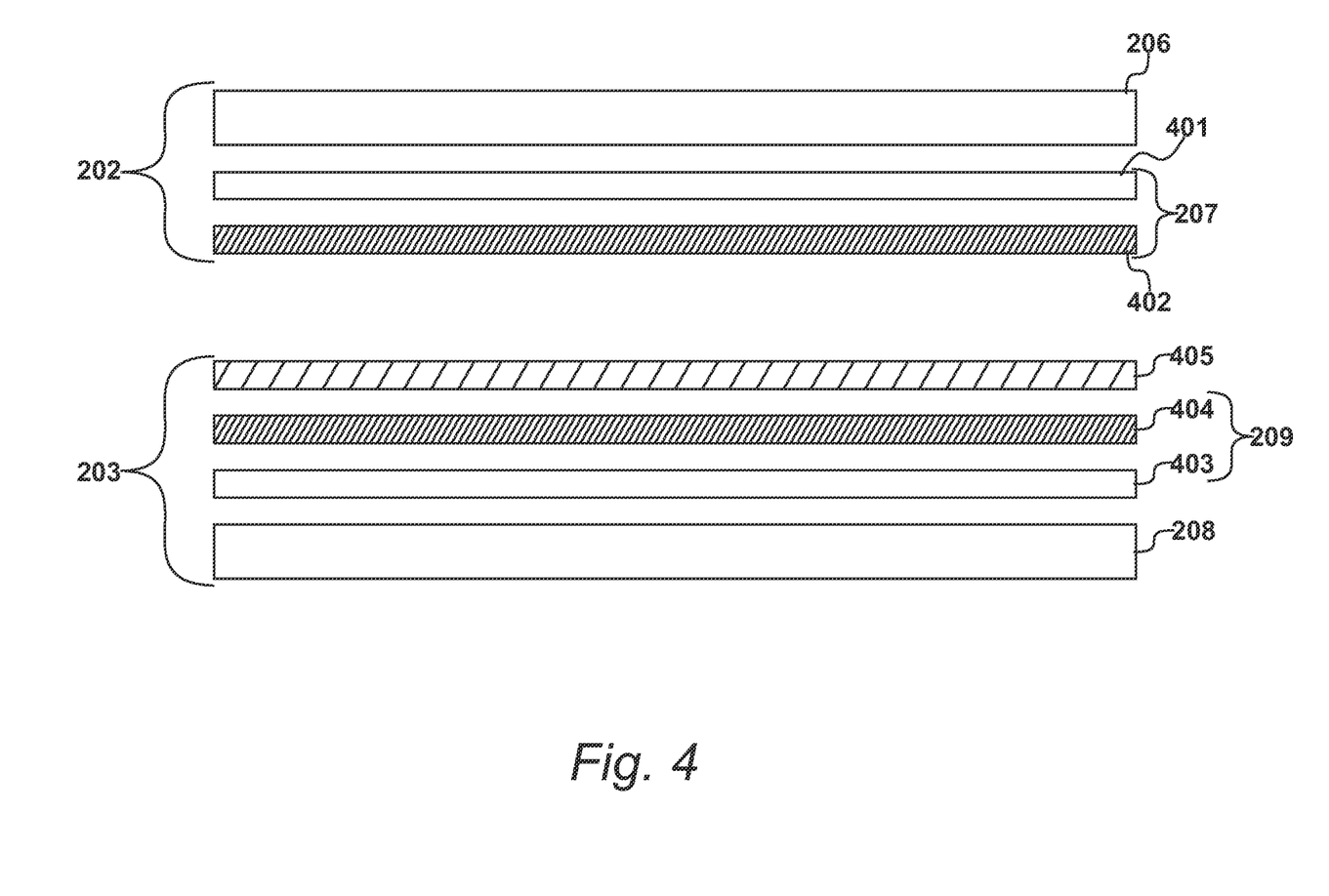
FIG. 4 shows the arrangement of a sensing region of a flexible sensor.

FIG. 4

In the embodiment of FIG. 4, conductive rows 207 and conductive columns 209 combine to define a sensing region 205 which is used to determine a mechanical interaction via connection to an electrical circuit so as to determine positional and/or extent properties of a mechanical interaction. This is calculated through use of the conductive materials which are applied to the substrate as will now be described.

FIG. 4 shows conductive layer 202 and conductive layer 203 in a diagrammatic cross-sectional exploded view. Conductive layer 202 comprises substrate 206 which is overprinted with a plurality of conductive rows 207. Conductive rows 207 comprise a layer of silver-loaded ink 401 and a layer of carbon loaded ink 402. In manufacture, the PET substrate 206 is printed initially with the silver ink 401 before being overprinted with conductive carbon 402.

In a similar manner, conductive layer 203 comprises a PET substrate 208 which is overprinted with a layer of silver-loaded ink 403 which is then overprinted with a conductive carbon loaded ink 404. Conductive layer 203 further comprises a substance 405 which exhibits a variable resistivity. In an embodiment, the resistivity of substance 405 is dependent on pressure applied to conductive layer 203.

In the embodiment described, substance 405 is a quantum tunnelling material such as QTC® in an ink format as supplied by the present applicant, Peratech Holdco Limited, Brompton-on-Swale, United Kingdom. Quantum tunnelling material 405 is overprinted over the conductive carbon ink 404 with each of the conductive layers of silver 403, carbon 404 and quantum tunnelling material 405 in combination forming the plurality of conductive columns 209.

It is appreciated that, in alternative embodiments, the quantum tunnelling material is printed on substrate 206 and forms part of conductive layer 202 rather than conductive layer 203. It is further appreciated that in a further embodiment both conductive layer 202 and conductive layer 203 both comprise layers of quantum tunnelling material.

The silver ink provides a high conductivity and may typically have a sheet resistance of around zero point four ohms (0.4Ω). In contrast the carbon ink provides a sheet resistance in the region of four hundred ohms (400Ω) but prints as a relatively smooth surface thereby providing improved contact between the layers.

Figure 5:
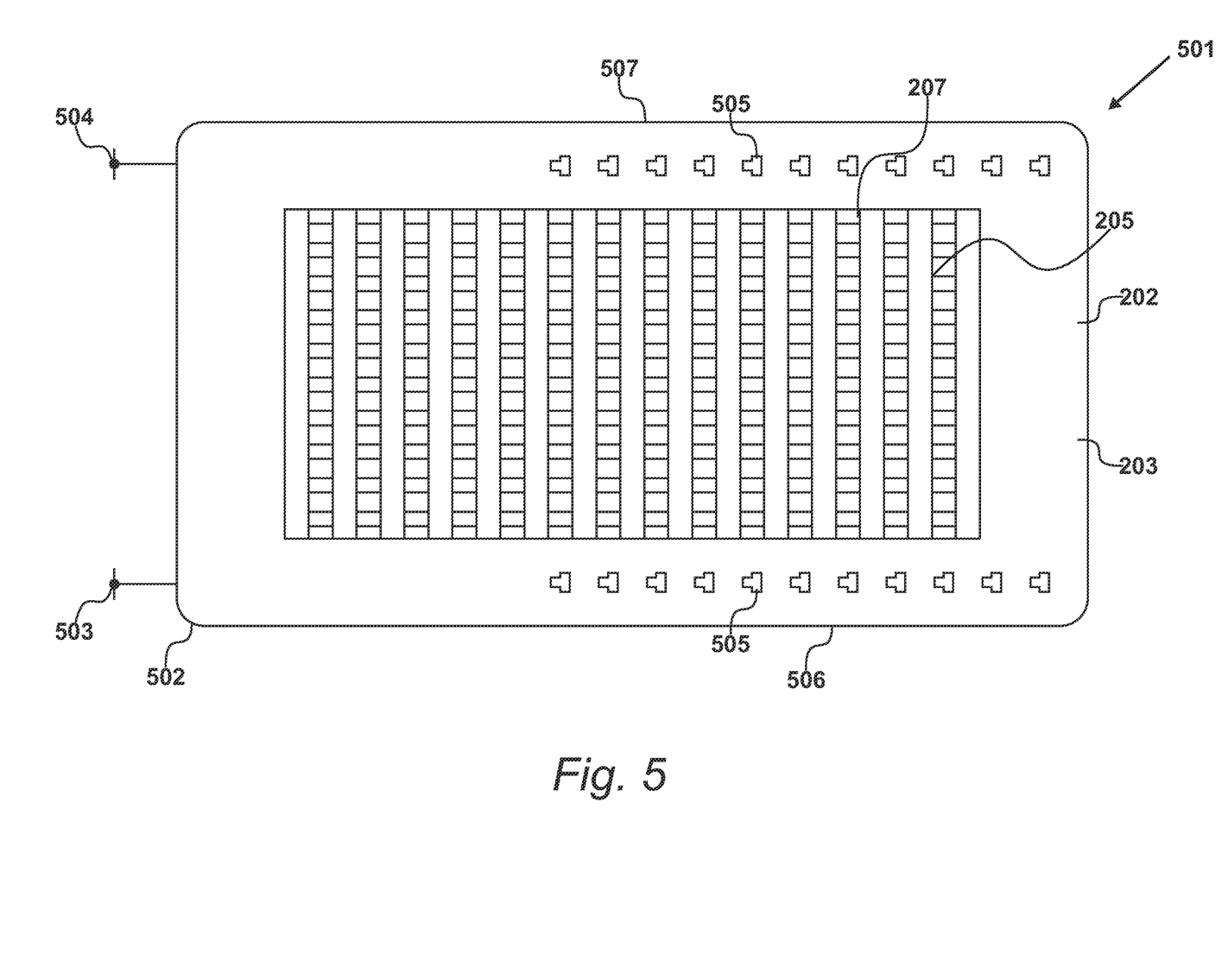
FIG. 5 shows a flexible sensor in isolation.

FIG. 5

A flexible sensor 501 is shown in isolation in a plan view in FIG. 5 with conductive layer 202 overlaying conductive layer 203. Conductive layers 202 and 203 have now been placed in substantially close proximity to form the substantially thin flexible sensor 501. Conductive layer 202 and conductive layer 203 define sensing region 205 for determining an interaction, in this example a mechanical interaction by means of a force applied. Sensing region 205 comprises the plurality of rows 207 and plurality of columns 209 of conductive layer 202 and conductive layer 203 respectively.

At a first end 502 of sensor 501, conductive layers 202 and 203 are constrained by means of a pressure sensitive adhesive (PSA) which adheres substrate 206 and substrate 208 together. At first end 502, flexible sensor 501 is further provided with electrical connectors 503 and 504 which are connected to conductive layers 202 and 203 respectively. Thus, in this way, the electrical potential gradient previously described in FIG. 3 can be established and processed to determine positional and extent properties of a mechanical interaction in a conventional manner.

Flexible sensor 501 includes a constraining means 505 which is configured to maintain conductive layer 202 and conductive layer 203 together. Constraining means 505 is positioned along a first edge 506 and a second edge 507 of sensor 501. However, while it is appreciated that the constraining means is configured to hold substrates 206 and 208 together, constraining means 505 does not constrain the flexible sensor 201 in the sensing region 205.

In this illustrated embodiment, constraining means 505 comprises a plurality of pins on substrate 206 and a plurality of corresponding slots on substrate 208. In this way, substrates 206 and 208 are loosely connected so as to maintain conductive layer 202 and conductive layer 203 together without restricting movement of the layers. The construction of constraining means 505 will be described further with respect to FIG. 6.

Figure 6A:
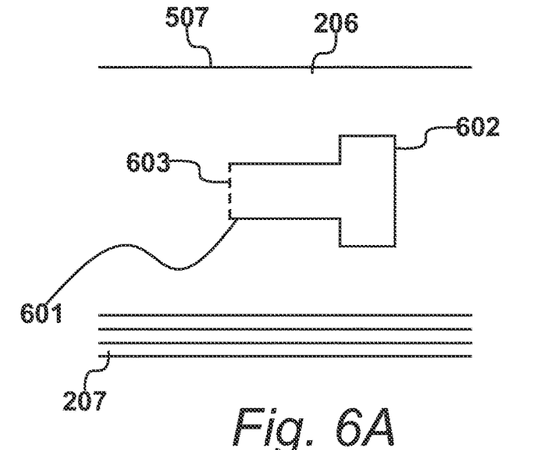
FIG. 6A shows a first substrate comprising a pin.
Figure 6B:
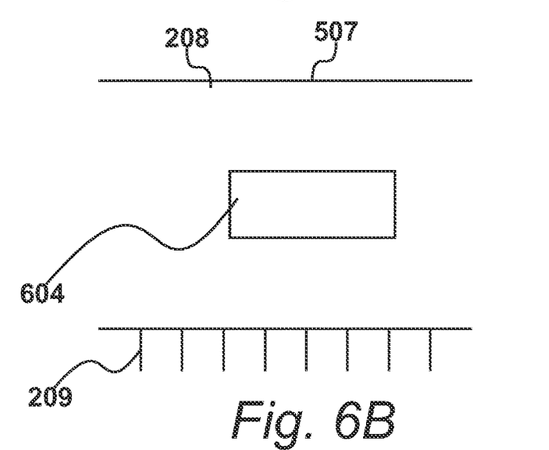
FIG. 6B shows a second substrate comprising a slot.
Figure 6C:
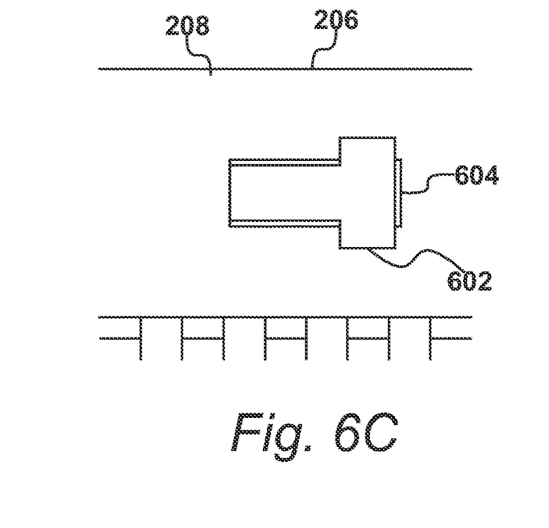
FIG. 6C shows first and second substrates being constrained by a constraining means.

FIGS. 6A, 6B and 6C

The construction of constraining means 505 is illustrated in greater detail with respect to FIGS. 6A, 6B and 6C. FIG. 6A shows a portion of conductive layer 202 comprising substrate 206. A pin 601, in the form of a t-shaped profile which has been scored into substrate 206 is positioned between edge 507 and the plurality of rows 207. The T-shaped profile 602 is cut through substrate 206 with line 603 providing a hinge where the substrate is uncut thereby enabling t-shaped profile 602 to be moved about hinge 603 and away from the main portion of substrate 206.

FIG. 6B shows a portion of conductive layer 203 comprising substrate 208. Substrate 208 comprises a slot 604 which has been cut into substrate 208 to present an aperture. Slot 604 is positioned in a relative position to pin 601 of substrate 206, between edge 507 and plurality of columns 209.

Thus, when substrates 206 and 208 are combined and positioned in close proximity, pin 601 and slot 604 can be combined in the manner of FIG. 6C. Thus, in FIG. 6C, t-shaped profile 602 is hinged and pushed through slot 604 to constrain substrates 206 and 208 together. In the embodiment of FIG. 5, it is appreciated that a plurality of slots and pins are utilised along edge 507.

It is further appreciated that in alternative embodiments, other arrangements may be used for the constraining means. For example, clamps, clips, adhesives or other fastenings can be utilised provided they maintain conductive layers 202 and 203 together without constraining sensing region 205. Furthermore, alternative shapes to the t-shaped profile and rectangular shaped slot may also be utilised.

Thus, in this example, the constraining means passes through the layers thereby restricting movement of the substrates in a first and second direction, that is, in the two planes parallel to FIGS. 5 and 6, but does not restrict them in a third direction perpendicular to the plane of these Figures. Thus, conductive layer 202 and conductive layer 203 are able to move independently of each other in this direction. Thus, in sensing region 205 conductive layers 202 and 203 are configured to be able to slide over each other when sensor 501 is flexed or bent. This will be described further in FIG. 7.

Figure 7A:
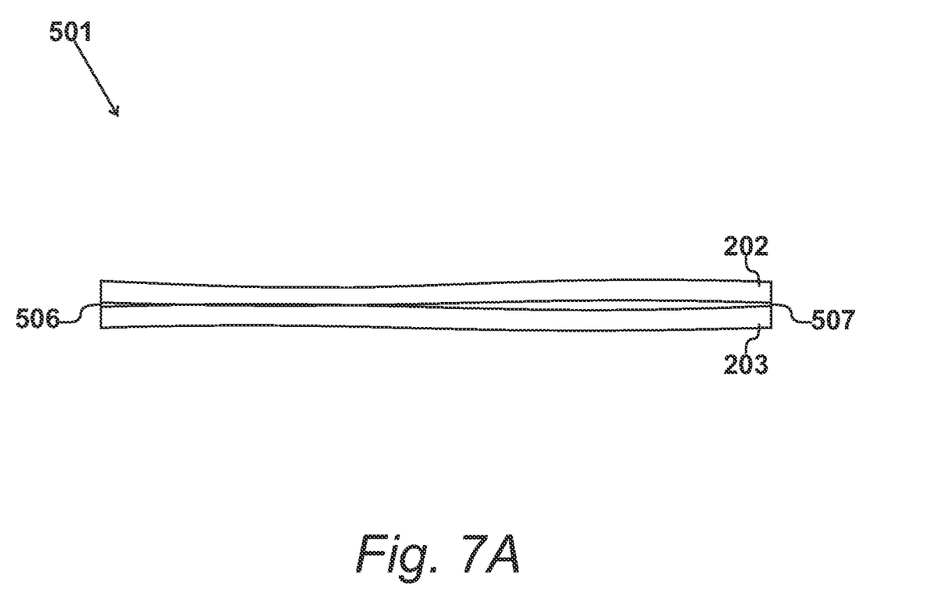
FIG. 7A shows a cross-sectional view of a flexible sensor in an inactive configuration.
Figure 7B:
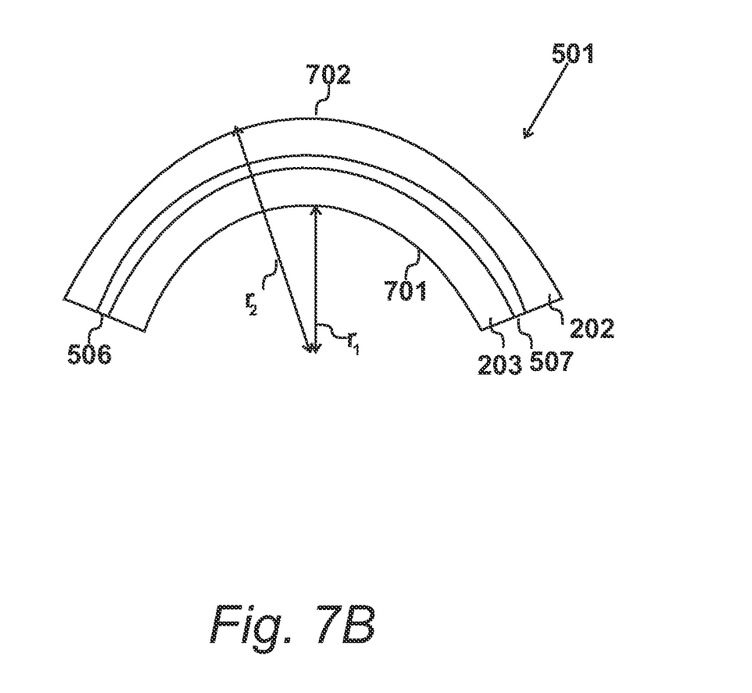
FIG. 7B shows a cross-sectional view of the flexible sensor of FIG. 6A in an arcuate configuration.

FIG. 7A and FIG. 7B

A diagrammatic illustration showing conductive layers 202 and 203 is shown in FIGS. 7A and 7B.

FIG. 7A shows flexible sensor 501 in an inactive configuration whereby conductive layer 202 is positioned substantially parallel to conductive layer 203 with a relatively small air gap between them. It is appreciated, however, that while FIG. 6A shows the two conductive layers having an air gap therebetween, in alternative embodiments, conductive layer 202 and conductive layer 203 may be in contact, but, with reference to the configuration of FIG. 7A, conduction is not permitted between the layers in this inactive configuration.

As described previously in FIG. 5, conductive layers 202 and 203 are loosely constrained at edges 506 and 507 and the constraining means acts to prevent conductive layers 202 and 203 from becoming separated. In this way, conductive layers 202 and 203 also remain sufficiently aligned to enable positional and extent properties to be determined. Referring now to FIG. 7B, sensor 501 has been flexed or bent into a substantially arcuate or curved shape such that conductive layer 203 forms a radius of curvature indicated at $r_1$ and conductive layer 202 forms a radius of curvature $r_2$.

In known sensors, this curvature results in the inner surface 701 of conductive layer 203 being subjected to compressive forces which causes the inner surface to wrinkle or buckle. This in turn leads to undesirable contact between conductive layer 203 and conductive layer 202. In a similar way, the outer surface 702 of conductive layer 202 stretches. However, the constraining means described in FIGS. 5 and 6 mean that conductive layer 202 and conductive layer 203 are permitted to move relative to each other in the direction of the centre of the radius $r_1$. Thus, conductive layer 202 and conductive layer 203 has additional freedom of movement enabling the gap to be maintained between the two layers thereby preventing false triggering and the induction of a start resistance between the two layers.

Figure 8A:
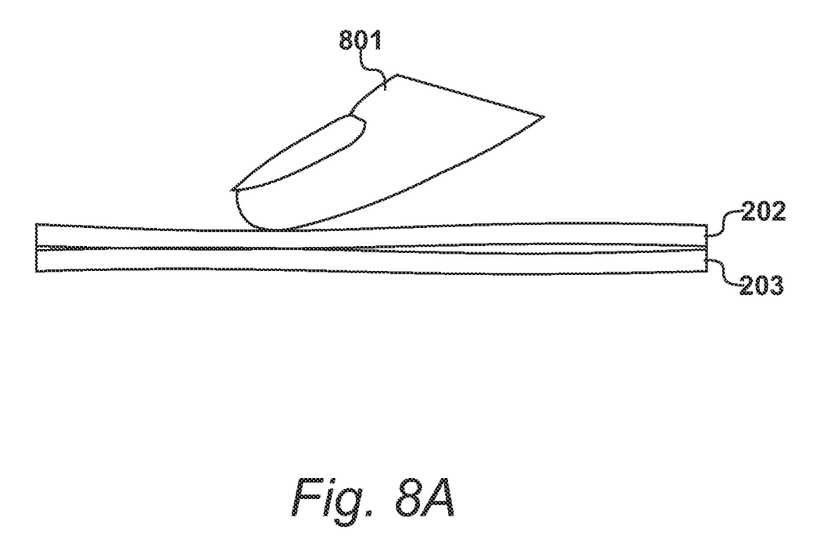
FIG. 8A shows a cross-sectional view of a flexible sensor on application of a mechanical interaction.
Figure 8B:
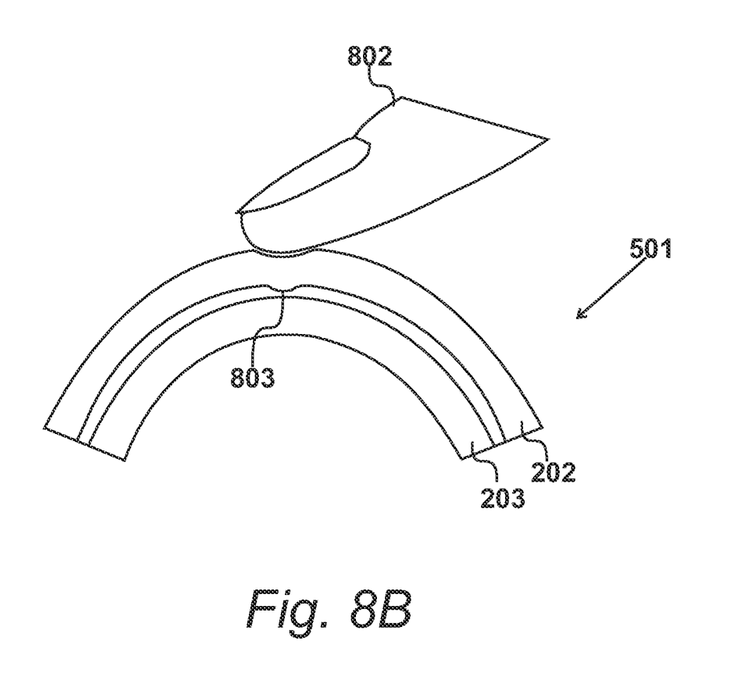
FIG. 8B shows a cross-sectional view of the flexible sensor of FIG. 8A in an arcuate configuration on application of a mechanical interaction.

FIG. 8A and FIG. 8B

Sensor 501 is shown further in FIGS. 8A and 8B in similar orientations to those of FIGS. 7A and 7B. FIG. 8A shows conductive layer 202 and conductive layer 203 when a mechanical interaction is applied, which in this case is a force being applied by a finger 801. When the force is applied in this configuration conductive layers 202 and 203 are forced together to provide conduction through the layers.

Thus, by utilising electrical connectors to provide connection to an electrical circuit, position and extent properties can be determined as required by means of conventional processing equipment.

In a similar manner, in the curved orientation of FIG. 8B when a force is applied by finger 802, conductive layer 202 and conductive layer 203 are forced together to provide a point of mechanical interaction at 803 whereby conductive layers 202 and 203 touch to provide conduction through the layers.

In this way, for a given force applied by finger 801 and finger 802 being substantially equal, the reading from sensor 201 will be substantially similar in both the configuration of FIG. 8A and the configuration of FIG. 8B.

Figure 9:
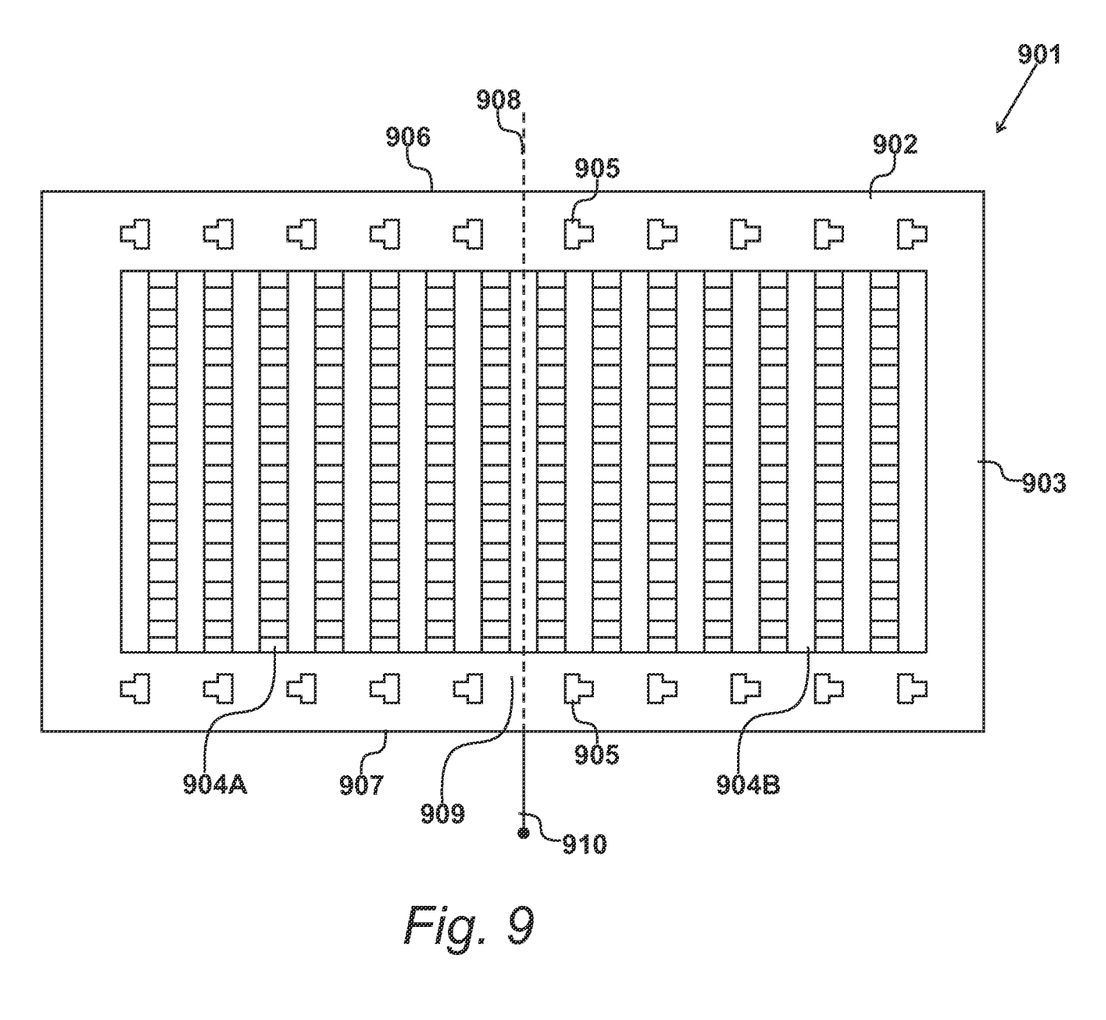
FIG. 9 shows a flexible sensor in an example embodiment.

FIG. 9

An alternative flexible sensor 901 in accordance with an aspect of the present invention is shown in FIG. 9. Flexible sensor 901 is substantially similar in operation and construction as flexible sensors 201 and 501 previously described. Flexible sensor 901 comprises a first conductive layer 902 and second conductive layer 903 which define a sensing region for determining a mechanical interaction. Conductive layer 902 and conductive layer 903 are configured to move independently of each other in the sensing region 904 such that when sensor 901 is bent or flexed the sensor does not false trigger or induce stresses in the substrates of the conductive layers. Sensor 901 includes constraining means 905 which is positioned along a first edge 906 and a second edge 907. In the embodiment, the constraining means comprises a plurality of pins positioned around edges 906 and 907 on conductive layer 902 and a plurality of slots positioned around edges 906 and 907 on conductive layer 903. In this embodiment, the plurality of pins and plurality of slots are substantially similar to those described in FIG. 6. It is appreciated, however, that other constraining means may be used that allow for flexibility in the sensing region in at least one direction.

In this embodiment, the flexible sensor 901 is constrained along a centre point 908 by a pressure sensitive adhesive (PSA). In this way, in the region 909 surrounding centre line 908 the layers are constrained and do not move independently of each other. This effectively creates two sensing regions 904A and 904B whereby, in either sensing region 904A or 904B, determination of a mechanical interaction can be made when the sensor 901 is being flexed. Region 909 is adhered and electrical connectors 910 are included in this region. Thus, the maximum positional integrity is maintained across the flexible sensor 901. In this way, a minimum amount of flexible sensing region is lost due to the electrical connectors.

Figure 10:
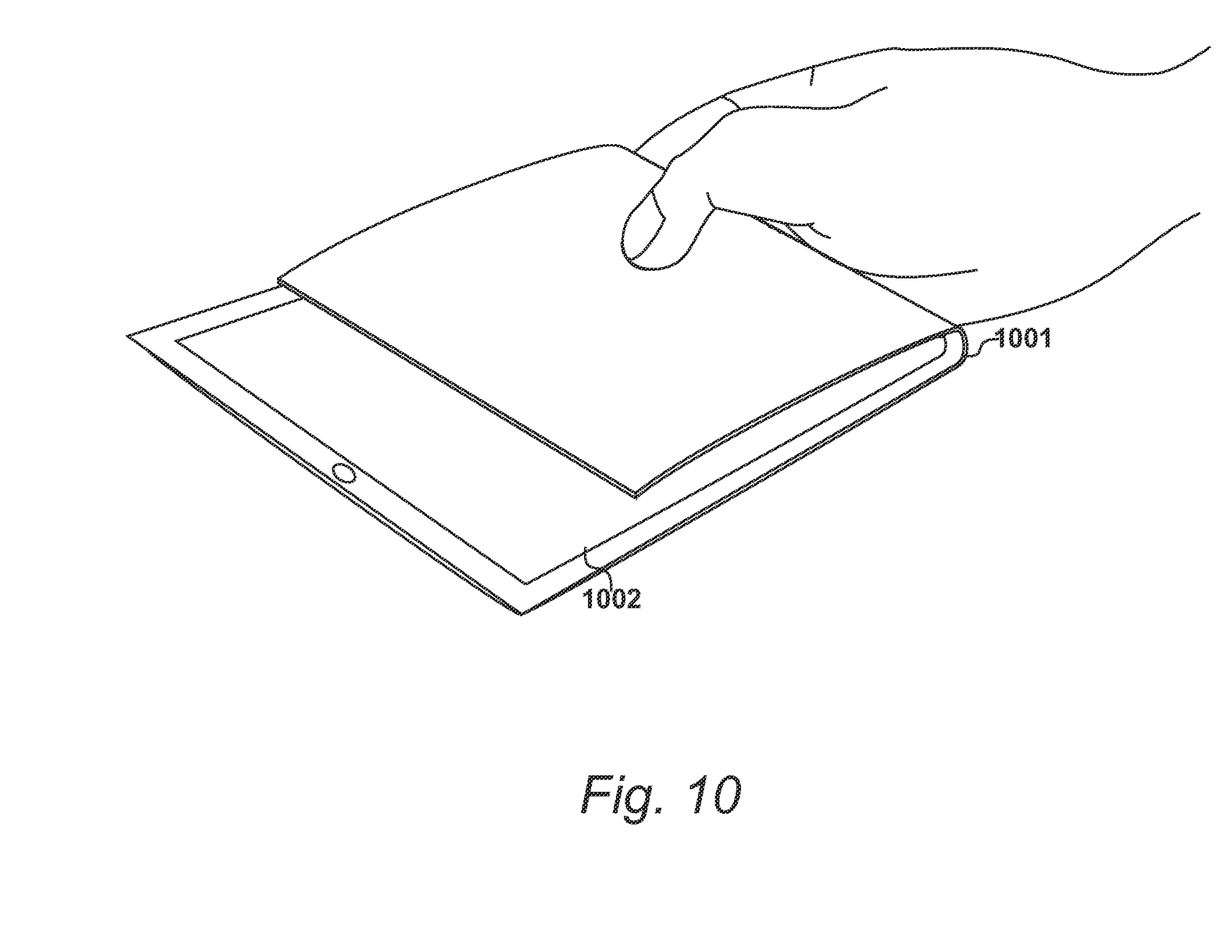
FIG. 10 shows a tablet computer folded into a storage configuration.

FIG. 10

An application utilising the flexible sensor as previously described may be that of providing a tablet computer. A tablet computer comprises a touchscreen which utilises a flexible sensor, such as flexible sensor 201. A user may use the tablet computer in a manner such that a flexible sensor of touchscreen is in a similar configuration to that shown previously in FIGS. 7A and 8A, wherein the flexible sensor is in a substantially flat configuration. However, tablet computer is configured to be flexible such that should a user wish to adjust the angle of the touchscreen for example, this can be done without damaging the touch capabilities of the sensor. In this way, a user is free to repeatedly adjust the touchscreen angle as desired without losing functionality of the flexible sensor therein.

Once a user has finished using tablet computer, it may be desirable to put the computer into storage. A tablet computer is shown in FIG. 10 in a flexible mode, whereby it is bent to produce a radius of curvature 1101 as illustrated. Thus, a user may choose to fold tablet in the manner shown in FIG. 10, such that the tablet can be stored at half its usual cross-sectional area as shown at 1002. However, due to the nature of the flexible sensor described herein, the conductive layers of the touchscreen are not put under any undue stresses while in storage and do not incur a start resistance while being stored as the conductive layers are permitted to move across each other and flex to a greater degree than conventional force sensors.

Figure 11:
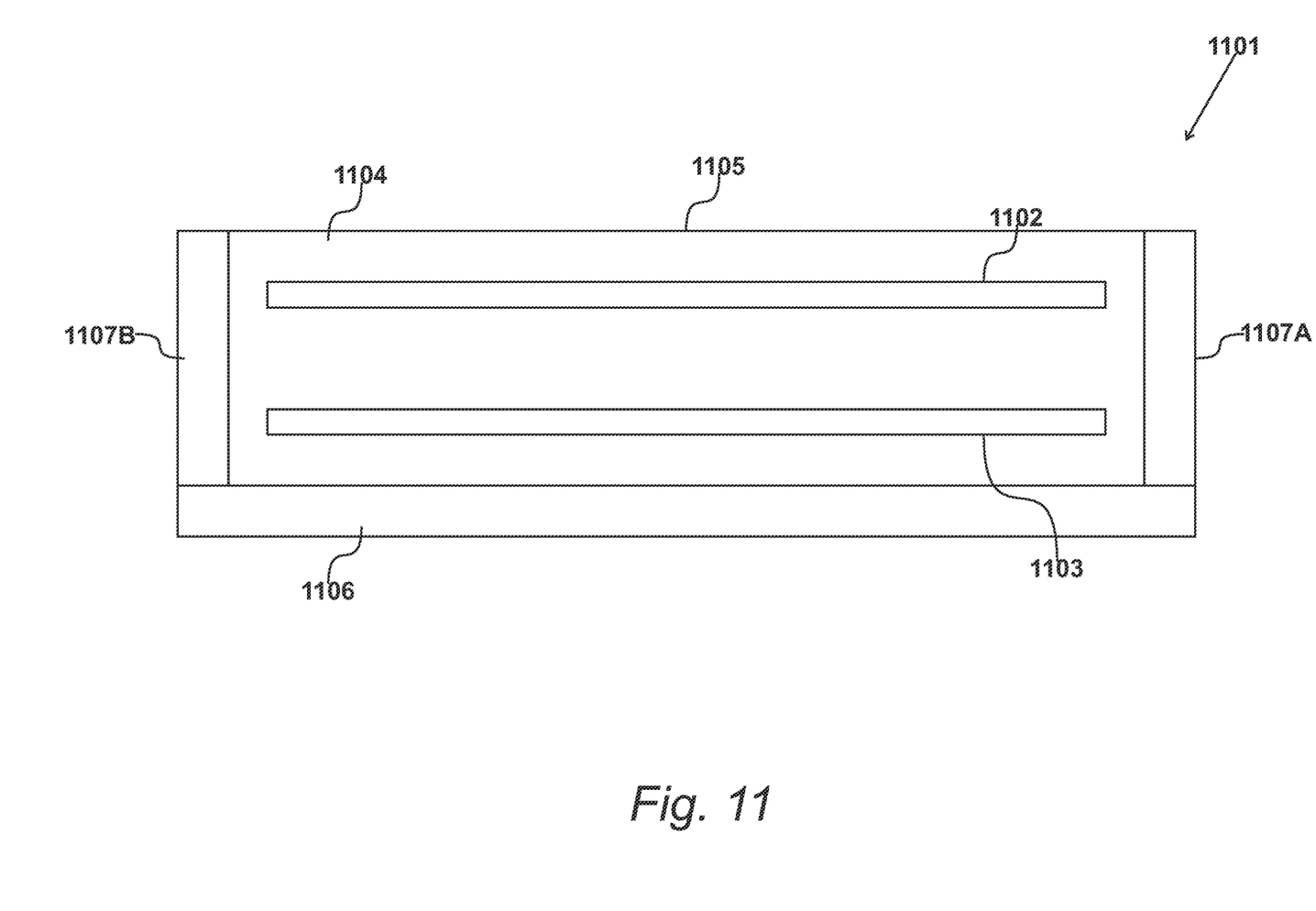
FIG. 11 shows a cross-sectional view of a flexible sensor suspended in an enclosure.

FIG. 11

A further embodiment of the flexible sensor as previously described herein is shown in FIG. 12 in a cross sectional side view. Flexible sensor 1101 comprises a first conductive layer 1102 and a second conductive layer 1103. In this embodiment, first conductive layer 1102 and second conductive layers 1103 are contained within an enclosure 1104 and are suspended in a free floating configuration within enclosure 1104. Conductive layers 1102 and 1103 are substantially similar to those as described in FIGS. 2 and 3 previously and together provide a sensing region for determining positional and/or extent properties in response to a mechanical interaction such as a finger press or force applied.

Enclosure 1104 comprises a protective layer 1105 which is constrained to an electronic device 1106 by means of a pressure sensitive adhesive 1107.

In this embodiment, electronic device 1106 is a display, such as the television 102 in FIG. 1 or a tablet computer similar to that shown in FIG. 10. Electronic device 1106 is configured to be flexible. Protective layer 1105 is mounted directly to electronic device 1106 however, it is appreciated that conductive layer 1102 and conductive layer 1103 are not directly connected to the electronic device 1106.

Figure 12:
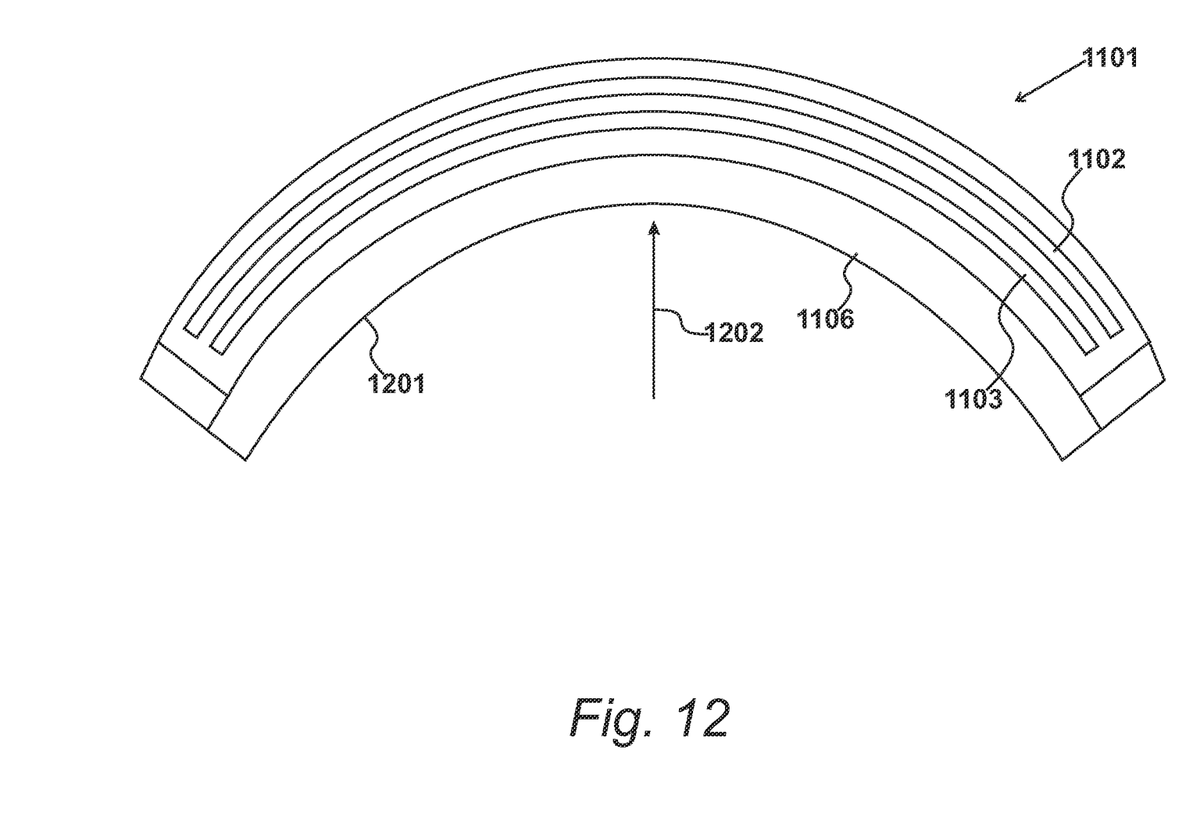
FIG. 12 shows the flexible sensor of FIG. 11 in an arcuate configuration.

In FIG. 12, electronic device 1106 is shown in a substantially flat configuration whereby flexible sensor 1101 is in an inactive configuration without conduction between conductive layer 1102 and conductive layer 1103. However, electronic device 1106 is able to flex to form an arcuate configuration as is shown and described further with respect to FIG. 13.

FIG. 12

Flexible sensor 1101 is shown further in FIG. 13 in an arcuate configuration when mounted to electronic device 1106. Electronic device 1106 has been flexed such that the front surface 1201 of electronic device 1206 forms a curved face in the manner of television 102 of FIG. 1. When a force 1202 is applied to the front surface 1201, conductive layers 1102 and 1103 are brought together in a similar way to that as previously described with reference to FIGS. 8A and 8B. Thus, when a force is not applied, conductive layers 1102 and 1103 are flexed but inactive such that conduction is not permitted between conductive layers 1102 and 1103. However when a force 1302 is applied to front surface 1301 curved conductive layers 1102 and 1103 are brought together such that conduction occurs between conductive layer 1103 and 1102.

Thus, stress is not imparted to the conductive layers 1102 and 1103 while in the configuration FIG. 12 or FIG. 13. However, when force 1202 is applied, conductive layers 1202 and 1203 connect to provide conduction through the layers.

Thus, the invention provides a solution to the aforesaid problems experienced with bendable or curved sensors by avoiding compression on the inside of the conductive layers which leads to the undesirable buckling and false triggering.

The invention claimed is:

1. A flexible sensor, comprising:
a first conductive layer; and
a second conductive layer; wherein:
said first conductive layer and said second conductive layer define a sensing region for determining a mechanical interaction;
said first conductive layer comprises a first substrate having a plurality of conductive rows printed thereon;
said second conductive layer comprises a second substrate having a plurality of conductive columns printed thereon;
said first conductive layer and said second conductive layer are loosely constrained by a constraining means along an edge of said flexible sensor so as to maintain said first conductive layer and said second conductive layer together; and
said constraining means is located outside said sensing region to permit independent movement of said first conductive layer and said second conductive layer perpendicular to each other in said sensing region.

2. The flexible sensor of claim 1, wherein said first conductive layer and said second conductive layer are constrained by said constraining means in a first direction and a second direction parallel to said first conductive layer and said second conductive layer respectively.

3. The flexible sensor of claim 1, wherein at least one of said first substrate or said second substrate comprises a substance that exhibits a variable resistivity and said variable resistivity is dependent upon pressure applied to said second conductive layer.

4. The flexible sensor of claim 3, wherein said substance is a quantum tunnelling composite.

5. The flexible sensor of claim 1, wherein each conductive row of said plurality of conductive rows comprises at least one of silver-loaded ink or carbon loaded ink.

6. The flexible sensor of claim 1, wherein each conductive column of said plurality of conductive columns comprises at least one of silver-loaded ink or carbon loaded ink.

7. The flexible sensor of claim 1, wherein said constraining means comprises a plurality of slots on one of said first conductive layer and said second conductive layer, and a plurality of corresponding pins on the other of said first conductive layer and said second conductive layer.

8. The flexible sensor of claim 1, wherein said first conductive layer and said second conductive layer are suspended in a free floating configuration within an enclosure.

9. The flexible sensor of claim 8, wherein said enclosure is attached to an electronic device.

10. The flexible sensor of claim 9, wherein said electronic device is a display.

11. The flexible sensor of claim 9, wherein said electronic device is substantially curved.

12. A method of manufacturing a flexible sensor, comprising the steps of:
providing a first conductive layer and a second conductive layer, said first conductive layer and said second conductive layer defining a sensing region for determining a mechanical interaction, said first conductive layer comprising a first substrate and said second conductive layer comprising a second substrate;
printing a plurality of conductive rows on said first substrate;
printing a plurality of conductive columns on said second substrate;
loosely constraining said first conductive layer and said second conductive layer by a constraining means along an edge of said flexible sensor to maintain said first conductive layer and said second conductive layer together; and
locating said constraining means outside said sensing region to permit independent movement of said first conductive layer and said second conductive layer perpendicular to each other in said sensing region.

13. The method of claim 12, further comprising the step of:
suspending said first conductive layer and said second conductive layer in a free floating configuration within an enclosure.

14. The method of claim 13, further comprising the step of:
attaching said enclosure to an electronic device.

15. The method of claim 12, wherein said step of constraining includes the step of:
constraining said first conductive layer and said second conductive layer by said constraining means in a first direction and a second direction parallel to said first conductive layer and said second conductive layer respectively.

16. The method of claim 12, further comprising the step of:
printing a substance that exhibits a variable resistivity onto said first substrate.

17. The method of claim 16, wherein said substance is a quantum tunnelling ink.

* * * * *